United States Patent [19]

Nguyen et al.

[11] Patent Number: 6,109,350
[45] Date of Patent: Aug. 29, 2000

[54] METHOD OF REDUCING WATER PRODUCED WITH HYDROCARBONS FROM WELLS

[75] Inventors: Philip D. Nguyen, Duncan; Brahmadeo T. Dewprashad, Lawton, both of Okla.

[73] Assignee: Halliburton Energy Services, Inc., Duncan, Okla.

[21] Appl. No.: 09/016,567

[22] Filed: Jan. 30, 1998

[51] Int. Cl.⁷ .................................................. E21B 33/13
[52] U.S. Cl. ........................................... 166/281; 166/294
[58] Field of Search ..................... 166/281, 280, 166/294, 295; 523/130; 507/924

[56] References Cited

U.S. PATENT DOCUMENTS

| | | | |
|---|---|---|---|
| 3,334,689 | 8/1967 | McLaughlin | 166/33 |
| 4,074,536 | 2/1978 | Young | 61/36 |
| 4,231,428 | 11/1980 | Needham et al. | |
| 4,518,039 | 5/1985 | Graham et al. | |
| 4,532,052 | 7/1985 | Weaver et al. | 252/8.55 R |
| 4,660,642 | 4/1987 | Young | |
| 4,732,920 | 3/1988 | Graham et al. | |
| 5,146,986 | 9/1992 | Dalrymple | 166/294 |
| 5,335,726 | 8/1994 | Rodrigues | 166/295 |
| 5,358,051 | 10/1994 | Rodiruges | 166/295 |
| 5,422,183 | 6/1995 | Sinclair et al. | 428/403 |
| 5,465,792 | 11/1995 | Dawson | |
| 5,484,019 | 1/1996 | Griffith | 166/293 |
| 5,566,760 | 10/1996 | Harris | 166/308 |

*Primary Examiner*—David Bagnell
*Assistant Examiner*—Zakiya Walker

[57] ABSTRACT

The present invention relates to methods of reducing water produced with hydrocarbons from subterranean formations penetrated by well bores. The methods basically comprise the steps of coating a particulate solid material with an organic polymer which reacts with water and swells when contacted therewith whereby the flow of water through a pack of the resulting polymer coated particulate solid material is reduced or prevented, and thereafter, placing a pack of the polymer coated particulate solid material in or adjacent to the formation whereby water and hydrocarbons produced from the formation are caused to flow through the pack.

14 Claims, No Drawings

METHOD OF REDUCING WATER PRODUCED WITH HYDROCARBONS FROM WELLS

BACKGROUND OF THE INVENTION

1. Field of the Invention

The present invention relates to methods of reducing water produced with hydrocarbons from wells, and more particularly, to methods of stimulating and/or completing a well while also reducing water production therefrom.

2. Description of the Prior Art

A variety of methods have heretofore been developed and used for reducing the flow of water produced with hydrocarbons from a subterranean formation. Such methods have generally involved pumping a fluid into the formation which forms a water blocking material therein. For example, U.S. Pat. No. 3,334,689 issued to McLaughlin on Aug. 8, 1967 discloses a water control method wherein an aqueous solution of a polymerizable composition containing a monoethylenically unsaturated acrylate monomer and a cross-linking agent are injected into the portion of a hydrocarbon producing formation from which water is also produced. The monomer and cross-linking agent are caused to form a stable cross-linked gel in the formation to thus reduce the water permeability of the formation and thereby terminate or at least decrease the rate of flow of water from the formation.

U.S. Pat. No. 5,358,051 issued to Rodrigues on Oct. 25, 1994 discloses a method of forming a gel in the water producing portion of a subterranean formation which also includes hydrocarbons to reduce or prevent the production of water from the formation. In accordance with the method, a self cross-linking monomer selected from hydroxy unsaturated carbonyl compounds is polymerized in the formation by a suitable initiator.

Other methods using various other water blocking agents including cross-linked gels, cement compositions and various polymers have been utilized to reduce the production of water from subterranean formations producing both hydrocarbons and water. However, such methods usually only minimize the water production in that the methods are often not utilized until after the water has invaded the oil zones in the formation and has become a severe problem due to the cost of separation and disposal.

Thus, there is a need for improved methods of economically reducing or preventing the production of water with hydrocarbons from a subterranean formation which can be implemented at an early time in the hydrocarbon producing life of the formation.

SUMMARY OF THE INVENTION

The present invention provides methods of reducing or preventing the production of water with hydrocarbons from subterranean formations which meet the needs described above and overcome the deficiencies of the prior art. The methods basically comprise the steps of coating a particulate solid material with an organic polymer which reacts with or absorbs water and swells when contacted therewith whereby the flow of water through a pack of the resulting polymer coated particulate solid material is reduced or prevented. A pack of the polymer coated particulate solid material is then placed in or adjacent to the formation whereby water and hydrocarbons produced from the formation are caused to flow through the pack.

The particulate solid material can be fracture proppant material which is typically graded sand. After being coated with the organic polymer, the proppant material is placed in one or more fractures created in a subterranean formation to maintain the fractures in the open position and stimulate hydrocarbon production from the formation. The flow of water with hydrocarbons produced through the packs of polymer coated proppant material in the fractures is reduced or shut-off by the swelling of the polymer when it is contacted by the water.

The particulate solid material can also be gravel utilized in a gravel pack formed in a subterranean formation or it can be the particulate material which is utilized in a pre-packed sand control screen placed in a well bore. Prior to forming a gravel pack in the formation or placing a pre-packed screen therein, the formation may be fracture stimulated as described above. In forming a gravel pack, a sand screen is placed in the well bore within the subterranean formation whereby an annulus between the sand screen and the walls of the well bore is formed. The gravel, which is also typically graded sand, is coated with an organic polymer which reacts with water and swells when contacted therewith and the gravel is then placed in the annulus between the sand screen and well bore. Hydrocarbons and water produced from the subterranean formation pass through the polymer coated gravel and the production of the water is reduced or prevented thereby.

It is, therefore, a general object of the present invention to provide improved methods of reducing water produced with hydrocarbons from wells.

A further object of the present invention is the provision of improved methods of reducing the production of water with hydrocarbons from a subterranean formation which can be performed while placing one or more packs of particulate material in the formation.

Other and further objects, features and advantages of the present invention will be readily apparent to those skilled in the art from a reading of the description of preferred embodiments which follows.

DESCRIPTION OF PREFERRED EMBODIMENTS

The present invention provides relatively simple and efficient methods of reducing the water produced with hydrocarbons from a subterranean formation penetrated by a well bore without appreciably reducing the hydrocarbons produced. In accordance with the methods, a particulate solid material is coated with an organic polymer which reacts with or absorbs water and swells when contacted therewith whereby the flow of water through a pack of the resulting polymer coated particulate solid material is reduced or prevented. Thereafter, a pack of the polymer coated particulate solid material is placed in or adjacent to a subterranean formation whereby water and hydrocarbons produced from the formation are caused to flow through the pack.

While the methods as described above can be performed in a subterranean formation at any time, the methods are preferably performed at an early stage in the hydrocarbon producing life of the subterranean formation whereby water does not have an opportunity to enter the oil producing zones in the formation. More particularly, if the subterranean formation is fracture stimulated to increase production of hydrocarbons therefrom and/or if a gravel pack or the like is formed or placed in the well bore adjacent to the formation, the methods of the present invention are preferably simultaneously performed with those procedures to reduce or prevent the subsequent production of water.

As is well understood by those skilled in the art, a well bore drilled into subterranean producing formation is often completed by cementing a string of casing in the well bore. Thereafter, a plurality of perforations are formed which extend through the casing and cement into the producing formation. When the producing formation is formed of unconsolidated material such as unconsolidated sand, the well bore penetrating the formation may be completed open hole with a pre-packed or other type of sand control screen, slotted liner, a sand screen and gravel pack or the like placed in the portion of the well bore penetrating the formation. A sand screen and gravel pack are also utilized in cased well bores penetrating subterranean formations containing loose and unconsolidated sand to prevent the migration of the sand with produced fluids.

In some of the subterranean producing formations penetrated by well bores it is advantageous to stimulate hydrocarbon production from the formations by hydraulically fracturing the formations. Typically, a hydraulic fracturing procedure is carried out by pumping a viscous fracturing fluid into the formation at a rate and pressure such that one or more fractures are created therein. A particulate solid proppant material is suspended in the fracturing fluid, and the fractures are extended in the formation by continued pumping of the fracturing fluid. After the pumping of the fracturing fluid has been terminated, the proppant material is deposited in the fractures whereby upon release of the pressure exerted on the formation, the fractures are prevented from closing by the presence of the proppant material therein. While various kinds of particulate solid proppant material can be utilized, graded sand is utilized in most applications.

In accordance with the present invention, when a subterranean producing formation is fracture stimulated, water which is subsequently produced along with hydrocarbons from the formation is reduced or prevented by carrying out the following steps. At least one fracture is created in the formation, and the particulate solid proppant material to be placed in the fracture is coated with an organic polymer which reacts with or absorbs water and swells when contacted therewith whereby the flow of water through a pack of the resulting polymer coated proppant material is reduced or prevented. Thereafter, a pack of the polymer coated proppant material is placed in the fracture whereby water and hydrocarbons produced from the formation by way of the fracture are caused to flow through the pack.

When a gravel pack is formed in a well bore penetrating a subterranean producing formation including both open hole completed well bores and cased well bores containing perforations, a sand screen is placed within the portion of the well bore penetrating the formation whereby an annulus is formed between the sand screen and the well bore. Hydrocarbons and water produced from the formation are caused to flow through the annulus between the sand screen and the well bore and through the sand screen. The term "sand screen" is used herein to mean a sand control screen, a slotted liner or other tubular device for screening migrating fines and sand out of produced fluids as the fluids flow through the device into the well bore. After the sand screen is placed in the well bore particulate solid material known as gravel, e.g., graded sand, is placed in the annulus between the sand screen and the well bore to position the sand screen, prevent formation cave-ins and to help screen out migrating fines and sand from the produced fluids.

In accordance with the present invention, when a gravel pack is placed in a well bore penetrating a subterranean formation, the water produced with hydrocarbons from the formation is simultaneously reduced by performing the following steps. A sand screen is placed in the well bore within the subterranean producing formation whereby an annulus is formed between the sand screen and the well bore and whereby water and hydrocarbons produced from the formation are caused to flow through the annulus and the sand screen. A particulate solid material is coated with an organic polymer which reacts with or absorbs water and swells when contacted therewith whereby the flow of water through a pack of the resulting polymer coated particulate solid material is reduced or prevented. Thereafter, a pack of the polymer coated particulate solid material is placed in the annulus between the sand screen and the well bore. As mentioned, when a pre-packed sand control screen is placed in the well bore penetrating a subterranean formation, the particulate material used to pre-pack the screen is coated with a water swellable organic polymer of this invention.

As will now be understood by those skilled in the art, the presence of a pack of the polymer coated particulate solid material formed in accordance with this invention reduces or prevents the flow of water through the pack without appreciably reducing the flow of hydrocarbons therethrough. Also, it will be understood that one or more packs of the polymer coated particulate solid material can be placed in locations within a subterranean producing formation other than in fractures or between sand screens and the walls of well bores. For example, the entire portion of a well bore which penetrates a subterranean producing formation can be filled with a continuous pack of the polymer coated particulate solid material. When the well bore is cased and includes perforations, the perforations including voids within the producing formation can be filled with the polymer coated particulate solid material. Other techniques for utilizing the polymer coated particulate solid material within a subterranean producing formation to reduce or prevent water flow therein will readily suggest themselves to those skilled in the art.

A variety of organic polymers which react with or absorb water and swell when contacted therewith can be utilized in accordance with the present invention. A number of such polymers which are hydrated or otherwise react whereby they form a highly viscous gel or swell when contacted with water are disclosed in U.S. Pat. No. 4,532,052 issued to Weaver, et al. on Jul. 30, 1985 which is incorporated herein by reference. Of the various polymers which can be used, non-ionic water soluble polymers combined with silane coupling agents and cationic water soluble polymers are generally preferred. Particularly preferred non-ionic polymers are those which are formed by polymerizing a vinyl silane with one or more water soluble organic monomers. Examples of vinyl silanes which can be utilized include, but are not limited to vinyltrimethoxysilane, vinyltriethyoxysilane, methacrylatetrimethoxysilane and methacrylatetriethoxysilane acrylate. Examples of water soluble organic monomers which can be utilized include, but are not limited to, 2-hydroxyethylacrylate, polyalkylacrylate, acrylamide, vinylmethyl ether, methacrylamide, vinylpyrrolidone and vinyl acetate. Particularly preferred such organic polymers are co-polymers of vinyltrimethoxysilane and 2-hydroxyethyl acrylate.

The above described polymers can be preformed and coated onto particulate solid material such as graded sand prior to being shipped to a job site. Alternatively, the vinyl silane and water soluble monomer or monomers used along with a polymerization initiator and a surfactant for facilitating coating of the particulate solid material can be combined with the solid material at the site whereby polymerization and coating of the solid material with the resulting polymer takes place. Thereafter, the polymer coated particulate solid material can be suspended in a hydrocarbon carrier fluid and deposited in or adjacent to a subterranean producing formation by way of a well bore penetrating the formation.

Cationic water soluble polymers can also be utilized which attach directly to negatively charged sand particle surfaces. Examples of suitable cationic water soluble polymers include, but are not limited to, a quaternized ammonium salt of polydialkyldiallyl polymers, a quaternized ammonium salt of polyethyleneimine polymers, a quaternized ammonium salt of polydimethylaminoethyl-methacrylate copolymers, a quaternized ammonium salt of poly N-(3-dimethylaminopropyl)acrylamide polymers and a quaternized ammonium salt of the reaction product of 2-hydroxypropyl N, N-dialkyl-amine and acrylamide or acrylamide and epichlorohydrin reacted with polyalkoxide. Of these, the quaternized ammonium salt of the reaction product of 2-hydroxypropyl N, N-dialkylamine and acrylamide or acrylamide and epichlorohydrin reacted polyalkoxide is preferred. As described above in connection with the non-ionic polymers, the sand or other particulate solid material utilized can be coated with the polymer prior to shipment to a job site or the particulate material can be coated at the job site by mixing the particulate material with the polymer in a suitable mixer. Thereafter, the polymer coated particulate material is suspended in a hydrocarbon carrier liquid and placed in a subterranean formation.

While the amount of the water swellable organic polymer coated on the particulate material can vary depending upon the particular polymer utilized, the organic polymer is generally coated onto the particulate material in an amount in the range of from about 0.1% to about 5% by weight of the particulate material.

In order to further illustrate the methods of the present invention the following examples are given.

EXAMPLE 1

A solution of 4 milliliters of 2-hydroxyethylacrylate monomer, 0.5 milliliters of triallylamine surfactant, 0.25 milliliters of vinyltrimethoxysilane, 0.025 grams of sodium persulfate polymerization initiator and 75 milliliters of an aqueous solution containing 2% by weight potassium chloride was prepared. The resulting solution was flowed through a 100 gram pack of Oklahoma Number 1 sand which was thereafter maintained at 180° F. for 16 hours. The sand pack had an initial brine permeability of 15 darcies and an initial kerosene permeability of 9.4 darcies. After the treatment in which the sand was coated with the water soluble hydroxyethylacrylate-trimethoxysilane copolymer formed, the sand pack had a brine permeability of 6.3 darcies and a kerosene permeability of 9.4 darcies.

EXAMPLE 2

A solution comprised of 3 milliliters of polyalkylacrylate monomer, 1 milliliter of epi capped polyethyleneoxide and 37 milliliters of water containing 2% by weight potassium chloride was prepared. The pH of the solution was adjusted to 10 with a 50% by weight aqueous sodium hydroxide solution. The resulting solution was flowed through a 2.38 centimeter diameter by 9.94 centimeter long Berea core which had been pre-treated with a brine solution having a pH of 10. The core was then shut-in for 20 hours at a temperature of 180° F. Prior to the treatment the core had a brine permeability of 181 millidarcies and a kerosene permeability of 65.7 millidarcies. After the treatment, the core had a brine permeability of 9.9 millidarcies and a kerosene permeability of 65.7 millidarcies.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the water produced with hydrocarbons from a subterranean formation penetrated by a well bore comprising the steps of:

(a) coating a particulate solid material with an organic polymer which either reacts with or absorbs water and swells when contacted therewith whereby the flow of water through a pack of the resulting polymer coated particulate solid material is reduced or prevented; and (b) placing a pack of said polymer coated particulate solid material in or adjacent to said formation whereby water and hydrocarbons produced from said formation are caused to flow into contact with said pack.

2. The method of claim 1 wherein said particulate solid material is sand.

3. The method of claim 1 wherein said organic polymer is a water soluble organic polymer.

4. The method of claim 1 wherein said organic polymer includes a silane coupling agent therewith.

5. The method of claim 1 wherein said organic polymer is a copolymer of a vinyl silane selected from the group consisting of vinyltrimethoxysilane, vinyltriethyoxysilane, methacrylatetrimethoxysilane, methacrylatetriethoxysilane and one or more water soluble organic monomers selected from the group consisting of 2-hydroxyethyl acrylate, polyalkylacrylate, acrylamide, vinylmethyl ether, methacrylamide and vinylpyrrolidone.

6. The method of claim 1 wherein said organic polymer is a cationic water soluble polymer selected from the group consisting of a quaternized ammonium salt of polydialkyldiallyl polymers, a quaternized ammonium salt of polyethyleneimine polymers, a quaternized ammonium salt of polydimethylaminoethyl-methacrylate copolymers and a quaternized ammonium salt of poly N-(3-dimethylaminopropyl)acrylamide polymers.

7. The method of claim 1 wherein said pack of polymer coated particulate material is placed in accordance with step (b) in a fracture formed in said formation.

8. A method of stimulating a subterranean producing formation penetrated by a well bore and reducing water produced with hydrocarbons therefrom comprising the steps of:

(a) creating at least one fracture in said formation;

(b) coating a particulate solid fracture proppant material with an organic polymer which reacts with water and swells when contacted therewith whereby the flow of water through a pack of the resulting polymer coated particulate solid proppant material is reduced or prevented; and (c) placing a pack of said polymer coated particulate solid proppant material in said fracture whereby water and hydrocarbons produced from said formation by way of said fracture are caused to flow into contact with said pack.

9. The method of claim 8 wherein said particulate solid proppant material is sand.

10. The method of claim 8 wherein said organic polymer is a water soluble organic polymer.

11. The method of claim 8 wherein said organic polymer includes a silane coupling agent therewith.

12. The method of claim 8 wherein said organic polymer is a copolymer of a vinyl silane selected from the group consisting of vinyltrimethoxysilane, vinyltriethoxysilane, methacrylatetrimethoxysilane and methacrylatetriethoxysilane and one or more water soluble organic monomers selected from the group consisting of 2-hydroxyethyl acrylate, polyalkylacrylate, acrylamide, vinylmethyl ether, methacrylamide and vinylpyrrolidone.

13. The method of claim 8 wherein said organic polymer is a cationic water soluble polymer selected from the group consisting of a quaternized ammonium salt of polydialkyldiallyl polymers, a quaternized ammonium salt of polyethyleneimine polymers, a quaternized ammonium salt of polydimethylaminoethyl-methacrylate copolymers and a quaternized ammonium salt of poly N-(3-dimethylaminopropyl)acrylamide polymers.

14. The method of claim 8 wherein a plurality of fractures are created in said formation in accordance with step (a) and a pack of said polymer coated particulate proppant material is placed in each of said fractures in accordance with step (c).

\* \* \* \* \*